(12) United States Patent
Ho

(10) Patent No.: US 6,842,450 B2
(45) Date of Patent: Jan. 11, 2005

(54) METHOD AND APPARATUS FOR ENHANCING THE EFFECTIVE TIMING MARGIN ON A DIGITAL SYSTEM BUS

(75) Inventor: Stephen Ho, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 829 days.

(21) Appl. No.: 09/767,328

(22) Filed: Jan. 22, 2001

(65) Prior Publication Data

US 2002/0097748 A1 Jul. 25, 2002

(51) Int. Cl.$^7$ .................. H04L 12/50; H04L 12/403; H04L 12/40; H04B 7/216; G06F 15/16
(52) U.S. Cl. .................. 370/364; 370/451; 370/335; 370/438; 709/253; 709/224; 709/234
(58) Field of Search .................. 370/451, 450, 370/400, 438, 441, 431, 432, 364, 473, 433, 437, 421, 515, 278, 280, 276, 489; 709/224, 253, 232, 234, 236; 375/222, 219, 377

(56) References Cited

U.S. PATENT DOCUMENTS

| | | | | |
|---|---|---|---|---|
| 4,646,287 A | * | 2/1987 | Larson et al. | 370/400 |
| 5,960,036 A | * | 9/1999 | Johnson et al. | 370/278 |
| 6,201,830 B1 | * | 3/2001 | Chellali et al. | 375/222 |
| 6,425,009 B1 | * | 7/2002 | Parrish et al. | 709/224 |

* cited by examiner

*Primary Examiner*—Hanh Nguyen
(74) *Attorney, Agent, or Firm*—Park, Vaughan & Fleming, LLP

(57) ABSTRACT

One embodiment of the present invention provides a system for enhancing the effective timing margins and the reliability of a digital system bus. The system monitors the digital system bus to determine the data flow between devices on the digital system bus. If an absence of data flow is detected, the system generates a pseudo-data signal to replace the normal data signal on the digital system bus. This pseudo-data signal is broadcast on the digital system bus, in order to keep the digital system bus active, thereby preventing subsequent transmissions from suffering from effects caused by an inactive digital system bus.

21 Claims, 2 Drawing Sheets

METHOD AND APPARATUS FOR ENHANCING THE EFFECTIVE TIMING MARGIN ON A DIGITAL SYSTEM BUS

BACKGROUND

1. Field of the Invention

The present invention relates to buses for transferring data in digital systems. More specifically, the present invention relates to a method and an apparatus for enhancing the timing margins and the reliability of digital system buses.

2. Related Art

Many computer buses now operate at giga-hertz rates which presents challenges to the system designers to maintain high reliability in the face of smaller timing margins.

The timing margins on these high-speed buses are affected by a number of small, but important effects. Included in these small effects are temperature effects, transmission line effects, first-pulse distortion effects, and timing jitter caused by pattern sensitive crosstalk effects.

The temperatures of driver and receiver transistors on a digital bus change depending on the power being dissipated within the transistors. The power being dissipated, in turn, depends on the data transitions on the bus. During idle times on the bus, driver and receiver transistors are not switching, which reduces the power being dissipated by the transistors. This can cause the temperatures of the driver and receiver transistors to change from their nominal values, thereby changing the characteristics of the bus when data transmissions resume. When data transmissions resume, it can take many data cycles for the temperatures to stabilize, which causes temperature induced effects on the timing margins.

Transmission line effects are caused by slight mismatches in impedance between the devices on the digital system bus and the terminations of the signal lines on the bus. As bus temperatures change, the impedance of the active devices changes. This mismatch of impedance causes signal reflections on the signal lines. These reflected signals appear as noise relative to the signals and can adversely affect the timing margins.

First pulse distortion effects follow from the digital system bus being held at a constant state during idle periods. After an idle period, the first pulse to be transmitted over the bus is distorted by a combination of mechanisms. Included in these mechanisms are changes in power supply voltages, and changes in device temperatures.

What is needed is a method and an apparatus for alleviating the detrimental effects listed above, thereby allowing reduced timing margins and greater reliability of the digital system bus.

SUMMARY

One embodiment of the present invention provides a system for enhancing the effective timing margins and the reliability of a digital system bus. The system monitors the digital system bus to determine the data flow between devices on the digital system bus. If an absence of data flow is detected, the system generates a pseudo-data signal to replace the normal data signal on the digital system bus. This pseudo-data signal is broadcast on the digital system bus, in order to keep the digital system bus active, thereby preventing subsequent transmissions from suffering from effects caused by an inactive digital system bus.

In one embodiment of the present invention, the system terminates the pseudo-data signal abruptly when the digital system bus is needed to transmit real data.

In one embodiment of the present invention, the pseudo-data signal is a pre-determined pattern sequence.

In one embodiment of the present invention, the pseudo-data signal is a continually changing pattern sequence generated by a pseudo-random generator.

In one embodiment of the present invention, the pseudo-data signal is a continually changing pattern sequence generated based on previous transitions on the digital system bus to maintain a substantially equal number of high transitions and low transitions on the digital system bus.

In one embodiment of the present invention, the pseudo-data signal is generated in software by a central processing unit associated with the host system.

In one embodiment of the present invention, the system directs the pseudo-data signal to a trash bin address, wherein the trash bin address is not used by devices on the digital system bus.

In one embodiment of the present invention, the system generates an idle command in conjunction with the pseudo-data signal, wherein the idle command informs devices on the digital system bus not to use the pseudo-data signal.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system.

This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device Components

Figure 1:
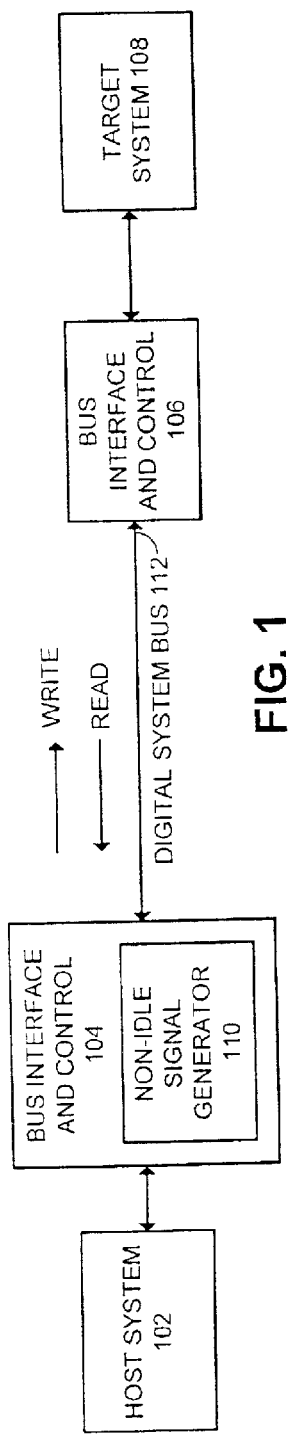
FIG. 1 illustrates components of a computing device coupled together in accordance with an embodiment of the present invention.

FIG. 1 illustrates components of a computing device coupled together in accordance with an embodiment of the present invention. Host system 102 and target system 108 can be any components of a computing device coupled together by a digital system bus 112. In this example, host system 102 is a central processing unit and target system 108 is a memory system.

Host system 102 can generally include any type of processor, including, but not limited to, a microprocessor, a mainframe computer, a digital signal processor, a personal organizer, a device controller and a computational engine within an appliance.

Host system 102 is coupled to bus interface and control 104. Bus interface and control 104 conditions the signals from host system 102 and places the signals on digital system bus 112. In addition, bus interface and control 104 receives signals from digital system bus 112 and conditions these signals for host system 102.

Target system 108 can include any type of non-volatile storage device that can be coupled to a computer system. This includes, but is not limited to, random access semiconductor memory, magnetic, optical, and magneto-optical storage devices, as well as storage devices based on flash memory and/or battery-backed up memory.

Target system 108 is coupled to bus interface and control 106. Bus interface and control 106 conditions the signals from target system 108 and places the signals on digital system bus 112. In addition, bus interface and control 106 receives signals from digital system bus 112 and conditions these signals for target system 108.

Bus interface and control 104 also monitors data traffic on digital system bus 112. When bus interface and control 104 detects an absence of data traffic on digital system bus 112, bus interface and control 104 receives a pseudo-data signal from non-idle signal generator 110 to place on digital system bus 112.

Non-idle signal generator 110 generates a pseudo-data signal to replace the normal data signal on digital system bus 112. Applying the pseudo-data signal to digital system bus 112 minimizes the environmental impacts stated above in the discussion of related art. The pseudo-data signal generated by non-idle signal generator 110 keeps digital system bus 112 at a constant load while digital system bus 112 is not being used for signal transmission.

When digital system bus 112 is functionally idle, non-idle signal generator 110 takes over digital system bus 112 to keep it active and thereby maintain a constant loading. The pseudo-data signal can be either a pre-constructed or dynamically generated signal pattern, which effectively keeps the number of logic transition states constant on digital system bus 112 in order to sustain device operating temperatures. Non-idle signal generator 110 optionally receives the normal data pattern being passed between host system 102 and bus interface and control 104 so that the pseudo-data signal can be dynamically generated to keep the logic transition states constant with respect to the real data signal.

The pseudo-data signal must be designed to minimize crosstalk due to majority state changes in each transmission cycle. In addition, the pseudo-data signal pattern must be designed to keep the maximum running 1s and 0s to an acceptable number in order to reduce the negative impact of the first-pulse distortion effect.

Applying the pseudo-data signal to digital system bus 112 during the absence of a real data signal results in reducing the timing margin required to achieve a given order of reliability on digital system bus 112 at the given operating frequency. In addition, applying the pseudo-data signal to digital system bus 112 during the absence of a real data signal reduces the statistical spread of signal pattern dependent faults, thereby increasing the operating frequency attainable on digital system bus 112.

Bus Interface and Control

Figure 2:
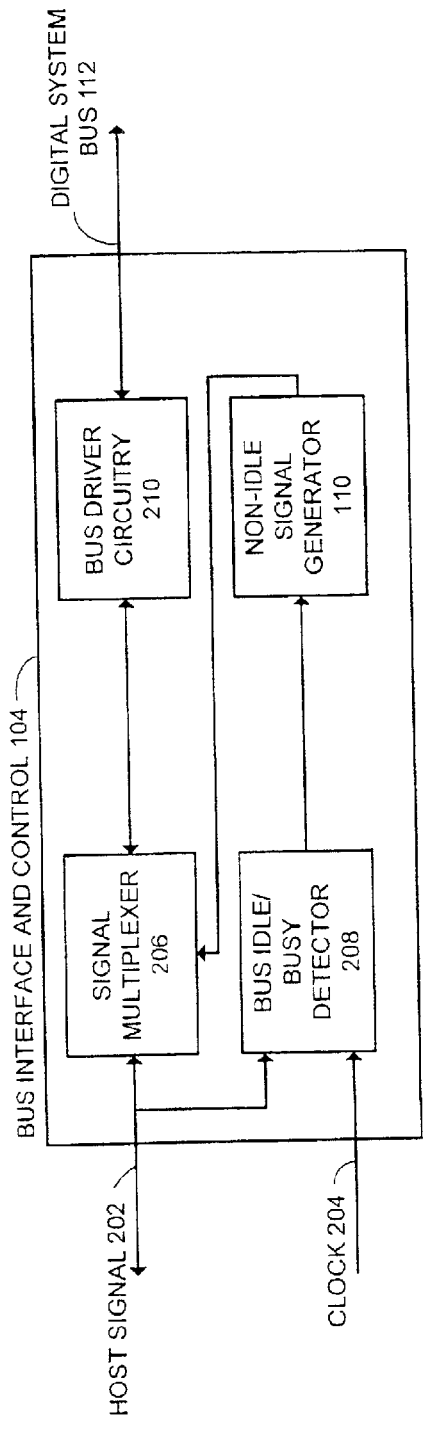
FIG. 2 illustrates details of bus interface and control 104 in accordance with an embodiment of the present invention.

FIG. 2 illustrates details of bus interface and control 104 in accordance with an embodiment of the present invention. Bus interface and control includes signal multiplexer 206, bus idle/busy detector 208, bus driver circuitry 210 and non-idle signal generator 110. Host signal 202, clock 204, and digital system bus 112 are coupled to bus interface and control 104 and operate as described below.

Host Signal 202 is coupled to signal multiplexer 206 and bus idle/busy detector 208. Host signal 202 includes control signals for determining the type of bus transaction and data associated with read and write transactions.

Bus idle/busy detector 208 receives the control signals from host signal 202 to determine whether host signal 202 is idle or busy. Bus idle/busy detector 208 also receives clock 204. By counting transitions on clock 204 while monitoring the control signals of host signal 202, bus idle/busy detector 208 can determine if host signal 202 is idle. Bus idle/busy detector 208 sends the idle/busy state to non-idle signal generator 110.

Non-idle signal generator 110 generates pseudo-data transactions while the idle/busy state indicates host signal 202 is idle. These pseudo-data transactions are coupled to signal multiplexer 206.

Signal multiplexer 206 selects the correct signal to couple to bus driver circuitry 210. When non-idle signal generator 110 is supplying pseudo-data transactions, the pseudo-data transactions are selected to couple to bus driver circuitry 210. When non-idle signal generator 110 is not supplying pseudo-data transactions, host signal 202 is coupled to bus driver circuitry 210.

Bus driver circuitry 210 conditions and couples data transactions between signal multiplexer 206 and digital system bus 112

Data Transfers

Figure 3:
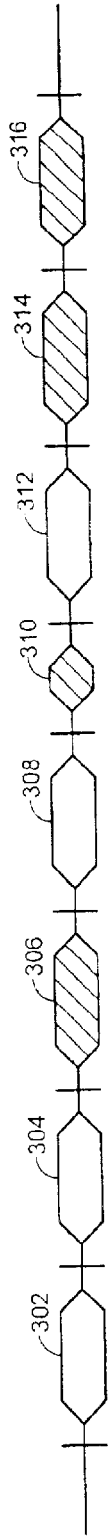
FIG. 3 is a timing diagram of data transfers on digital system bus 112 in accordance with an embodiment of the present invention.

FIG. 3 is a diagram illustrating the timing of data transfers on digital system bus 112 in accordance with an embodiment of the present invention. Data transfers during times 302, 304, 308, and 312 are representative of normal read or write transfers between host system 102 and target system 108. Data transfers during times 306, 310, 314, and 316 are representative of pseudo-data transfers which originate from non-idle signal generator 110 in response to no real data transfers being detected by bus interface and control 104.

During times 302 and 304, host system 102 has real data to transfer on digital system bus 112. At time 306, host system 102 does not have real data to transfer so non-idle signal generator 110 supplies pseudo-data to keep digital system bus 112 from being inactive. At time 308, host system 102 again has real data to transmit on digital system bus 112. During time 310, host system 102 does not have any real data to transmit so non-idle signal generator 110 again supplies a pseudo-data signal to digital system bus 112. Note, however, that host system 102 has real data for digital system bus 112 prior to the normal end of time 310. The pseudo-data being transmitted on digital system bus 112 during time 310 is abruptly terminated to allow the transfer of real data during time 312, thereby disrupting the flow of real data transactions. After the real data is transferred on digital system bus 112 during time 312, non-idle signal generator 110 supplies pseudo-data during times 314 and 316.

Bus Monitoring and Pseudo-Data Generation

Figure 4:
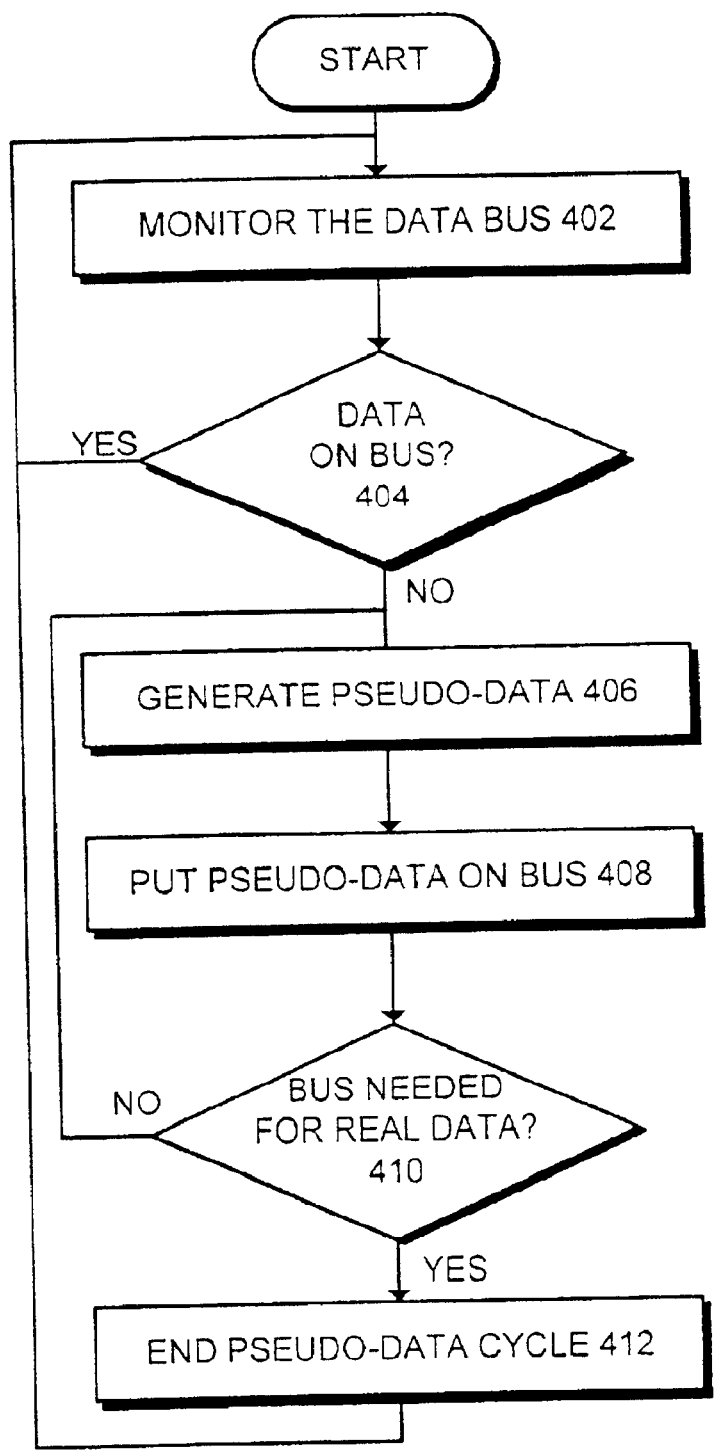
FIG. 4 is a flowchart illustrating the process of monitoring digital system bus 112 and generating pseudo-data as required in accordance with an embodiment of the present invention.

FIG. 4 is a flowchart illustrating the process of monitoring digital system bus 112 and generating pseudo-data as required in accordance with an embodiment of the present invention. The system operates when bus interface and control 104 monitors digital system bus 112 to determine if there is real data traffic on digital system bus 112 (step 402). If there is real data on the digital system bus 112, the system returns to 402 and continues to monitor the bus (step 404).

If there is no real data on the bus at 404, non-idle signal generator 110 generates a pseudo-data signal to replace the normal data flow on digital system bus 112 (step 406). Next, bus interface and control 104 puts the pseudo-data signal on digital system bus 112 as a substitute for real data (step 408). While pseudo-data is being placed on digital system bus 112, bus interface and control 104 monitors the signals from host system 102 to determine if digital system bus 112 is needed for real data (step 410). If digital system bus 112 is not needed for real data, the process returns to 406 to continue to supply pseudo-data to digital system bus 112.

If digital system bus 112 is needed for real data while non-idle signal generator 110 is supplying pseudo-data, transmission of pseudo-data on digital system bus 112 is immediately terminated to allow host system 102 to take control of digital system bus 112 (step 412). After terminating the transmission of pseudo-data on digital system bus 112, the system returns to 402 to continue monitoring digital system bus 112.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for enhancing effective timing margins and reliability of a digital system bus, comprising:
   monitoring the digital system bus to determine a data flow between devices on the digital system bus; and
   if an absence of data flow between devices on the digital system bus is detected;
   generating a pseudo-data signal, and
   transmitting the pseudo-data signal on the digital system bus, in order to keep the digital system bus active so that subsequent transmissions do not suffer from effects caused by an inactive digital system bus;
   wherein keeping the digital system bus active provides a constant load that maintains the digital system bus at a nominal operating temperature, thereby mitigating temperature-induced effects on timing margins, transmission-line effects, and first pulse distortion effects caused by an idle system bus.

2. The method of claim 1, further comprising terminating the pseudo-data signal abruptly when the digital system bus is needed to transmit real data.

3. The method of claim 1, wherein the pseudo-data signal is a pre-determined pattern sequence.

4. The method of claim 1, wherein the pseudo-data signal is a continually changing pattern sequence generated by a pseudo-random generator.

5. The method of claim 1, wherein the pseudo-data signal is a continually changing pattern sequence generated based on previous transitions on the digital system bus to maintain a substantially equal number of high and low transitions on the digital system bus.

6. The method of claim 1, further comprising directing the pseudo-data signal to a trash bin address, wherein the trash bin address is not used by devices on the digital system bus.

7. The method of claim 1, further comprising generating an idle command in conjunction with the pseudo-data signal, wherein the idle command informs devices on the digital system bus not to use the pseudo-data signal.

8. An apparatus that facilitates enhancing effective timing margins and reliability of a digital system bus, comprising:
   a monitoring mechanism that is configured to monitor the digital system bus to determine a data flow between devices on the digital system bus;
   a generating mechanism that is configured to generate a pseudo-data signal if an absence of data flow between devices on the digital system bus is detected; and
   a transmission mechanism that is configured to broadcast the pseudo-data signal on the digital system bus, in order to keep the digital system bus active so that subsequent transmissions do not suffer from effects caused by an inactive digital system bus;
   wherein keeping the digital system bus active provides a constant load that maintains the digital system bus at a nominal operating temperature, thereby mitigating temperature-induced effects on timing margins, transmission-line effects, and first pulse distortion effects caused by an idle system bus.

9. The apparatus of claim 8, further comprising a terminating mechanism that is configured to terminate the pseudo-data signal abruptly when the digital system bus is needed to transmit real data.

10. The apparatus of claim 8, wherein the pseudo-data signal is a pre-determined pattern sequence.

11. The apparatus of claim 8, further comprising a pseudo-random generator configured to generate a continually changing pattern sequence for the pseudo-data signal.

12. The apparatus of claim 8, wherein the pseudo-data signal is a continually changing pattern sequence generated based on previous transitions on the digital system bus to maintain a substantially equal number of high and low transitions on the digital system bus.

13. The apparatus of claim 12, wherein the pseudo-data signal is generated by software, wherein the software executes on a central processing unit associated with a host system.

14. The apparatus of claim 8, further comprising an addressing mechanism that is configured to direct the pseudo-data signal to a trash bin address, wherein the trash bin address is not used by devices on the digital system bus.

15. The apparatus of claim 8, further comprising an idle command generating mechanism that is configured to generate an idle command in conjunction with the pseudo-data signal, wherein the idle command informs devices on the digital system bus not to use the pseudo-data signal.

16. The apparatus of claim 8, wherein effects caused by the inactive digital system bus include a first pulse distortion effect caused by temperature and voltage changes associated with a first pulse after an idle period on the digital system bus.

17. The apparatus of claim 8, wherein effects caused by the inactive digital system bus include a power supply effect associated with the digital system bus returning to a constant load level after an idle period on the digital system bus.

18. The apparatus of claim 8, wherein effects caused by the inactive digital system bus include a transmission line mis-matching effect associated with signal reflections on the digital system bus caused by mis-matched impedance on the digital system bus.

19. The apparatus of claim 8, wherein effects caused by the inactive digital system bus include temperature effects associated with signal driver transistors being held in a constant state of conduction during an idle period on the digital system bus.

20. The apparatus of claim 8, wherein the generating mechanism is further configured to generate the pseudo-data signal in a manner such that crosstalk is minimized across the digital system bus.

21. A computer system that facilitates enhancing effective timing margins and reliability of a digital system bus, comprising:

a central processor unit coupled to the digital system bus;

a memory subsystem coupled to the digital system bus;

a monitoring mechanism that is configured to monitor the digital system bus to determine a data flow between the central processor unit and the memory subsystem on the digital system bus;

a generating mechanism that is configured to generate a pseudo-data signal if an absence of data flow between the central processor unit and the memory subsystem is detected; and a transmission mechanism that is configured to broadcast the pseudo-data signal on the digital system bus, in order to keep the digital system bus active so that subsequent transmissions between the central processor unit and the memory subsystem do not suffer from effects caused by an inactive digital system bus;

wherein keeping the digital system bus active provides a constant load that maintains the digital system bus at a nominal operating temperature, thereby mitigating temperature-induced effects on timing margins, transmission-line effects, and first pulse distortion effects caused by an idle system bus.

* * * * *